United States Patent
van den Goor

(10) Patent No.: US 6,202,825 B1
(45) Date of Patent: *Mar. 20, 2001

(54) CONVEYOR

(75) Inventor: Jacobus Marie van den Goor, Sh Nuenen (NL)

(73) Assignee: Vanderlande Industries Nederland B.V., Veghel (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/210,805

(22) Filed: Dec. 15, 1998

(30) Foreign Application Priority Data

Dec. 17, 1997 (NL) .................................................. 1007820

(51) Int. Cl.[7] .................................................. B65G 47/10
(52) U.S. Cl. ...................... 198/358; 198/370.02; 198/890
(58) Field of Search ............................. 198/358, 370.02, 198/890, 357

(56) References Cited

U.S. PATENT DOCUMENTS

| | | | |
|---|---|---|---|
| 3,608,698 | * 9/1971 | Crall | 198/31 AA |
| 3,752,311 | * 8/1973 | Kobusch et al. | 209/72 |
| 4,214,663 | * 7/1980 | Schopp et al. | 209/558 |
| 4,373,624 | * 2/1983 | Molins et al. | 198/347 |
| 4,414,825 | 11/1983 | Gittelbauer | 62/374 |
| 5,427,223 | 6/1995 | Van Den Goor | 198/365 |
| 5,435,429 | 7/1995 | Van Den Goor | 198/890.1 |
| 5,590,995 | 1/1997 | Berkers | 414/357 |
| 5,657,858 | * 8/1997 | Van Den Goor | 198/890 |
| 5,667,054 | 9/1997 | Van Den Goor | 198/370.04 |
| 5,826,695 | * 10/1998 | Van Den Goor | 198/370.02 |
| 5,826,704 | 10/1998 | Van Den Goor | 198/851 |
| 5,842,557 | * 12/1998 | Montemayor et al. | 198/418.1 |
| 5,860,504 | * 1/1999 | Lazzarotti | 198/357 |
| 5,890,584 | * 4/1999 | Bonnet | 198/867.15 |
| 5,894,918 | * 4/1999 | Bonnet | 198/370.04 |
| 5,921,378 | * 7/1999 | Bonnet | 198/850 |
| 5,927,465 | * 7/1999 | Shearer, Jr. | 198/370.02 |

FOREIGN PATENT DOCUMENTS

| | | |
|---|---|---|
| 1 150 021 | 6/1963 | (DE) . |
| 196 12 116 | 10/1997 | (DE) . |
| 0 784 026 | 7/1997 | (EP) . |

* cited by examiner

*Primary Examiner*—Christopher P. Ellis
*Assistant Examiner*—Rashmi Sharma
(74) *Attorney, Agent, or Firm*—Oblon, Spivak, McClelland, Maier & Neustadt, P.C.

(57) ABSTRACT

The invention relates to a conveyor comprising a frame and a drivable endless conveying element, which is provided with carriers extending transversely to the intended direction of movement of the conveying element during operation, which carriers are coupled to at least one endless flexible coupling member, while at least a few carriers support pusher elements. The pusher elements are connected to guide means, which are capable of cooperation with guide rails supported by the frame, all this in such a manner that a pusher element can be moved in the longitudinal direction of the associated carrier in one or more places during operation. The carriers are provided with wings, which bound receiving spaces being disposed one behind the other and having mutually different dimensions, measured in the intended direction of movement of the conveying element.

5 Claims, 6 Drawing Sheets

CONVEYOR

BACKGROUND OF THE INVENTION

1. Field of the Invention

The present invention generally relates to a conveyor and more particularly, to a conveyor including a frame and a drivable endless conveying element, which is provided with carriers extending transversely to the intended direction of movement of the conveying element during operation, which carriers are coupled to at least one endless flexible coupling member, while at least a few carriers support pusher elements, which pusher elements are connected to guide means, which are capable of cooperation with guide rails supported by the frame, all this in such a manner that a pusher element can be selectively moved in the longitudinal direction of the associated carrier in one or more places during operation, and wherein the carriers are provided with upwardly extending wings, which bound receiving spaces which are open at their upper sides, and are disposed one behind the other, seen in the intended direction of movement of the conveying element.

2. Discussion of Background

A conveyor of this type is known, for example, from European patent application No. 0 784 026, which patent is hereby incorporated by reference. With this known conveyor, the wings are spaced relatively closely together, seen in the intended direction of movement of the conveyor, since the conveyor is, in particular, intended for handling comparatively small objects.

In practice, it has become apparent that it may be desirable to have a possibility to handle also objects of larger dimensions with such a conveyor.

SUMMARY OF THE INVENTION

According to the present invention, this can be achieved in a simple and efficient manner, using a conveyor including receiving spaces of mutually different dimensions, measured in the intended direction of movement of the conveying element.

When using the construction according to the present invention, it is possible to provide, in addition to a number of receiving spaces which are bounded by wings which are spaced relatively closely apart, and which are intended for receiving comparatively small objects, receiving spaces which are bounded by wings which are spaced more widely apart for forming receiving spaces which are suitable for receiving larger objects.

BRIEF DESCRIPTION OF THE DRAWING

The present invention will be explained in more detail hereafter by means of an embodiment of a conveyor according to the present invention which is schematically illustrated in the accompanying figures.

FIG. 4(*b*) is a larger-scale cross-sectional view of a carrier and pusher element cooperating with said carrier.

DETAILED DESCRIPTION OF THE PREFERRED EMBODIMENTS

Figure 1:
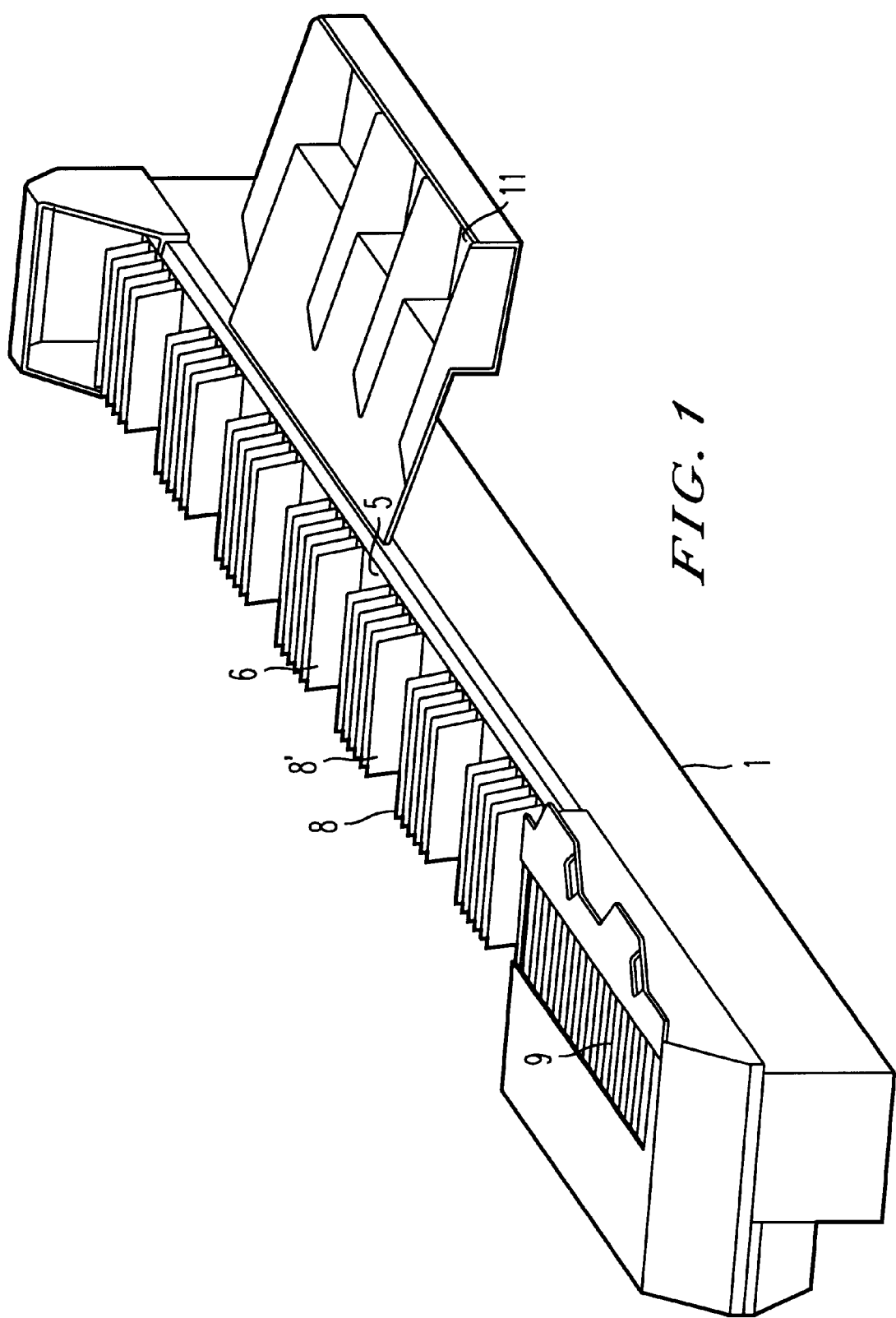
FIG. 1 is a schematic, perspective view of an embodiment of a conveyor according to the invention.

The conveyor C, which is shown in the figures, includes a frame 1, wherein pulleys 2 and 3, capable of rotation about horizontal axes of rotation, are journalled. An endless coupling element, in the form of a chain 4, is passed over the pulleys. The chain 4 can be set moving by rotating one of the pulleys 2 and 3 via a driving motor (not shown) or similar, which is in turn controlled by a controller 15 in such a manner that the upper part of chain 4 will move in the direction indicated by arrow A.

Carriers 5, extending perpendicularly to the longitudinal direction of chain 4, are attached to the links of the 4 chain.

Attached to the trailing end of a number of carriers 5, seen in the intended direction of movement of the endless chain or conveying element 4, is a wing 6 which slopes upwardly to the rear. The illustrated embodiment is thereby such that a wing 6 is attached to each one of a number of carriers 5 arranged one behind the other, so that a receiving space 8 is bounded between two successive wings. In addition to that, a few successive carriers 5 are not fitted with a wing 6, so that a larger receiving space 8' is formed between two successive wings 6.

Figure 4A:
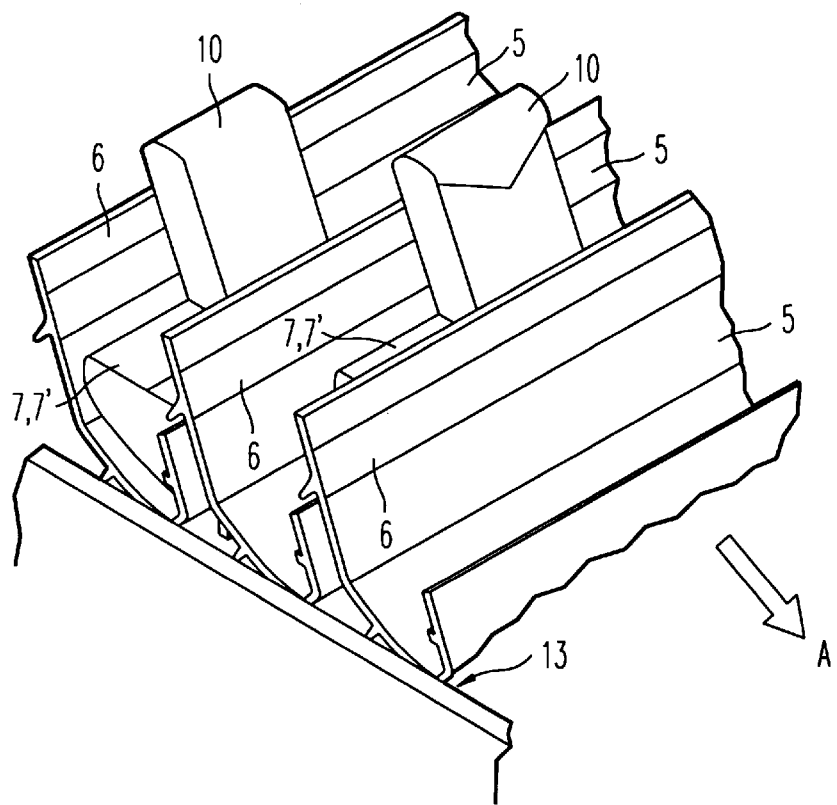
FIG. 4(*a*) is a perspective view of a few carriers which are arranged one behind the other.
Figure 4B:
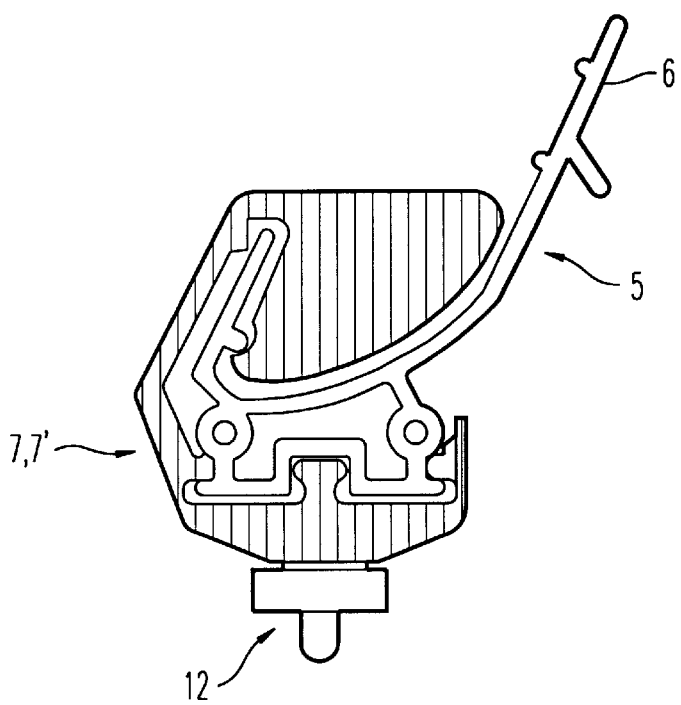
Figure 5:
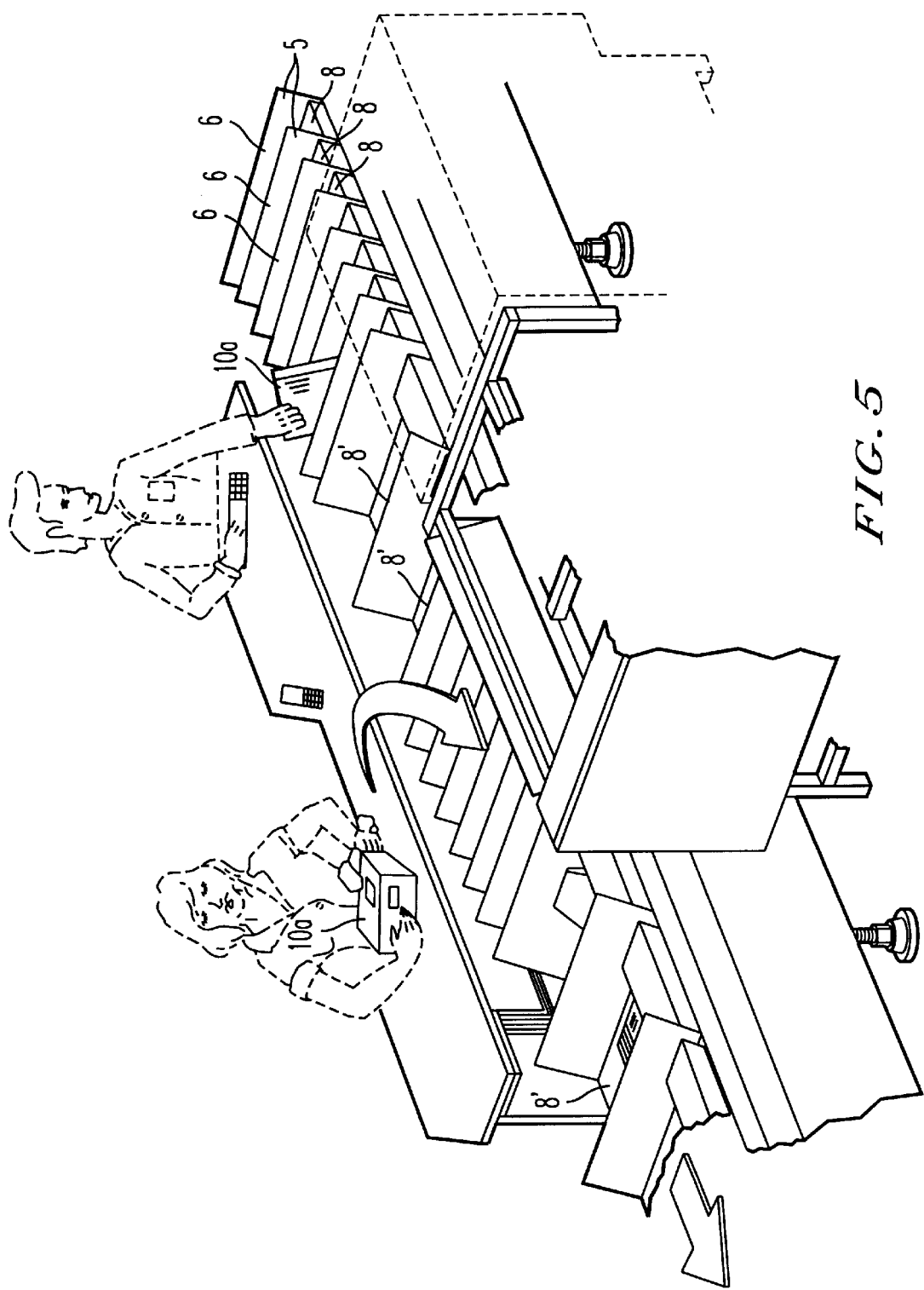
FIG. 5 is a perspective view of a conveyer showing workers manually placing larger objects 10*b* in larger receiving spaces 8' and smaller objects 10*a* in smaller receiving spaces 8.

Provided on carriers 5 are pusher elements 7 and 7', which pusher elements are positioned in receiving spaces 8 and 8', respectively. The pusher elements 7 and 7' can be selectively moved in the longitudinal direction of respective carriers 5 at predetermined positions, using guide means 12 connected to the pusher elements 7, 7' and guide rails 13 secured to the frame, for example, like those shown in FIG. 4 (*a*) and 4(*b*), which cooperate with the guide means 12, for the purpose of shifting objects 10 that may be present on the carriers 5.

Figure 2:
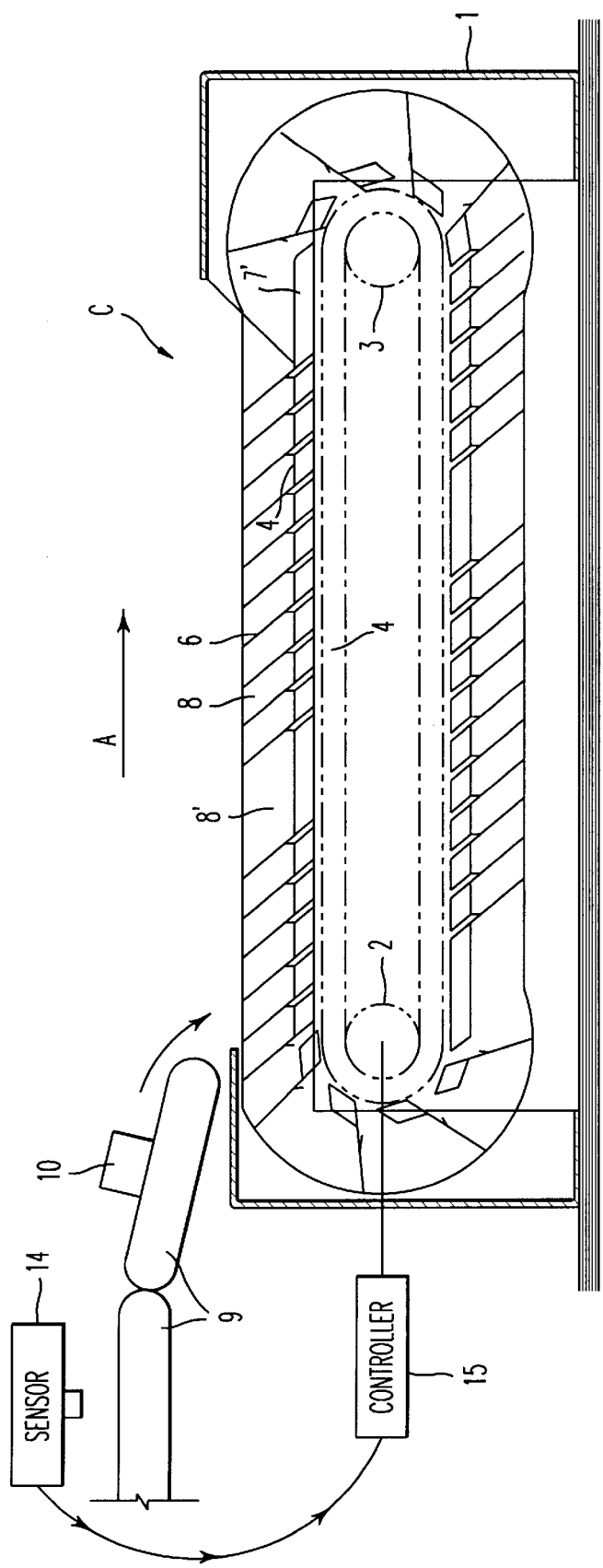
FIG. 2 is a schematic, smaller-scale cross-sectional view of a conveyor according to the invention.

The general construction and operation of such a conveyor C, which is only diagrammatically shown in FIGS. 1 and 2, is generally known, for example from European patent No. 0 444 734 and from FR-A-2388737, U.S. Pat. Nos. 4,138,008 and 3,361,247, all of which patents are hereby incorporated by reference, so that it is not considered necessary to-discuss the construction and the operation of such a conveyor C in great detail herein. It will be apparent thereby that a pusher element 7' extending over several carriers 5 is slidably connected to only one of the carriers 5, and that it extends loosely over the other carriers 5.

Figure 3:
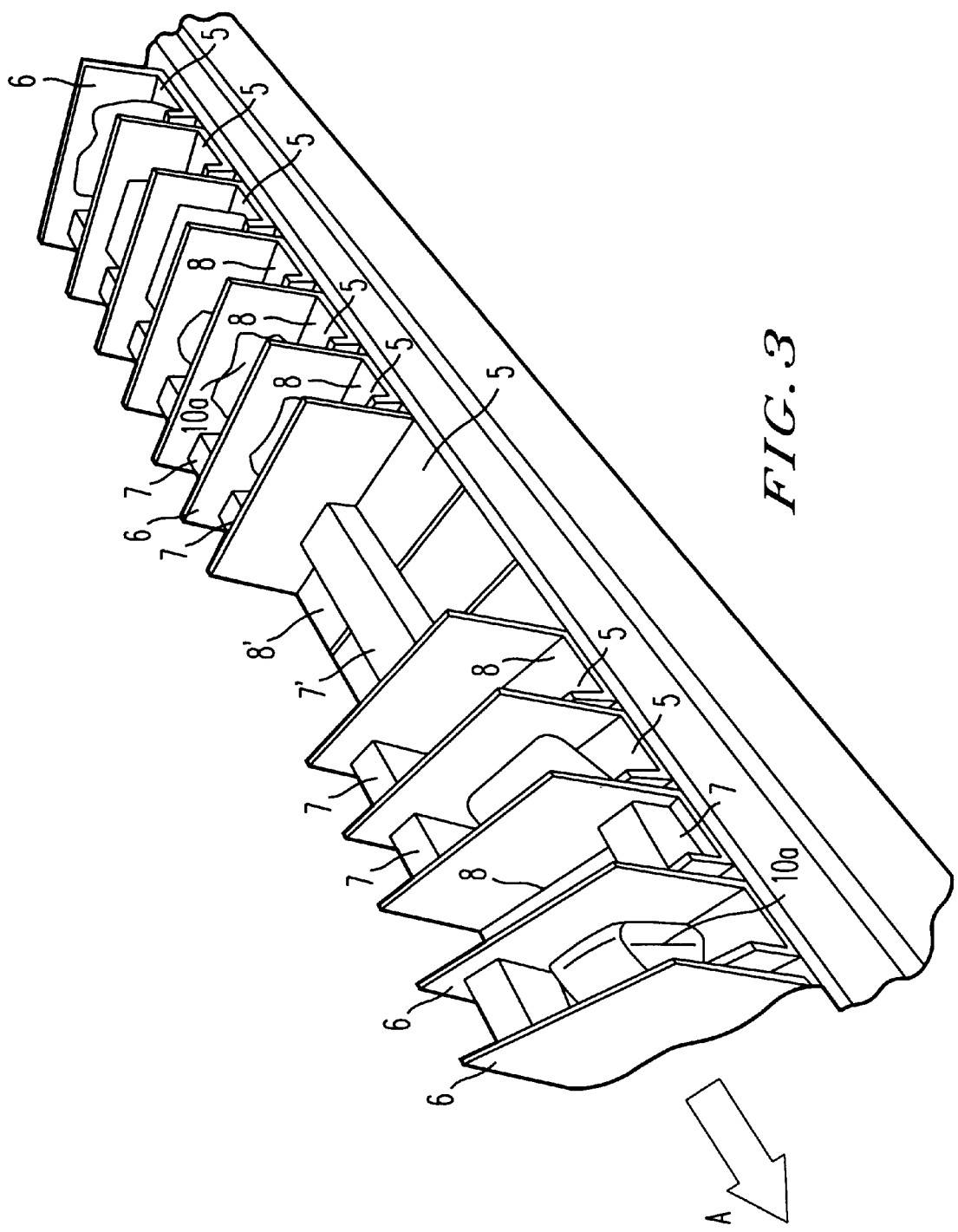
FIG. 3 is a perspective view of a part of the conveyor according to the invention, seen from a different angle than in FIG. 1.

As is shown in more detail in FIG. 3, objects 10 can be supplied, for example,via a feed element 9, to the receiving spaces 8 bounded by wings 6, which are open on their upper sides and which are bounded by carriers 5 on their lower sides, or to receiving spaces 8' bounded by wings 6 and carriers 5.

The dimensions of the objects 10, which are successively supplied on conveyor belt 9, can be determined via sensors 14. Sensors 143 are provided, which determine the dimensions of the objects 10 being supplied by the feed element 9 and which control the drive of any one of the feed element 9, the endless conveying element 4, and both the feeding element 9 and the endless conveying element 4, in dependence on the dimensions of the objects 10. The positioning of a sensor 14 is shown schematically in FIG. 2 as being disposed near, and perferably above conveyor belt 9, and the drive of the endless coupling element or chain 4 or conveying element can be controlled in dependence thereon, in such a manner that small objects 10a are delivered via a feed element 9 to smaller receiving spaces 8, which are bounded by two wings 6 which are spaced comparatively closely apart, while larger objects 10 are delivered to large receiving spaces 8', which are bounded by wings 6 which are spaced comparatively widely apart. The small and large objects 10a and 10b, thus received in small and large receiving spaces 8 and 8' respectively can be discharged in a manner known per se, via pusher elements 7, and 7' respectively, in discharge chutes 11 or similar, which are disposed near one side of the conveyor. Also a construction wherein discharge chutes, discharge belts or similar are disposed on either side of the conveyor will be conceivable, of course. As is shown in the Figures, one or more larger receiving spaces 8' will be present between two successive groups of small receiving spaces 8.

Figure 6:
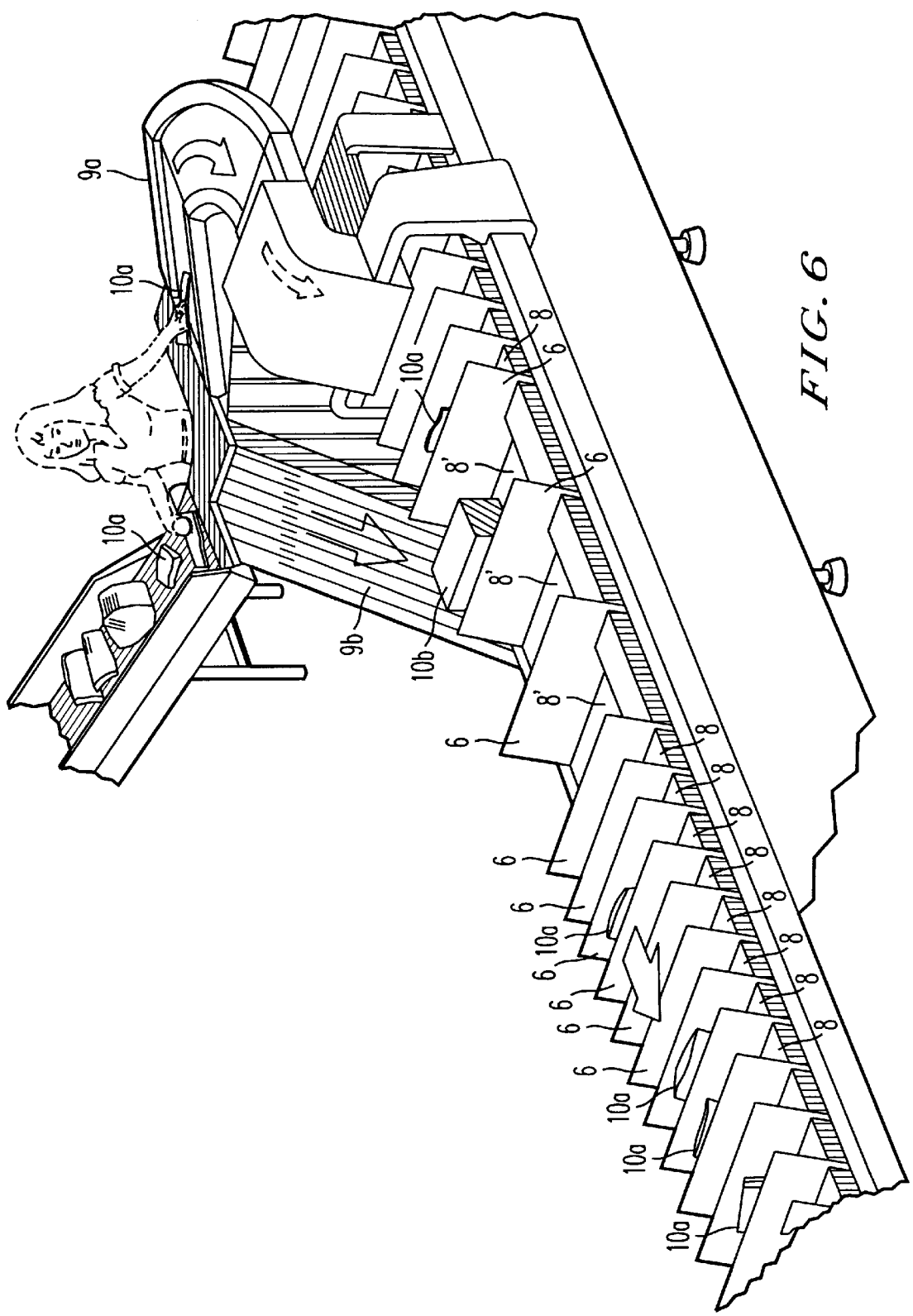
FIG. 6 is a perspective view of a conveyor showing a construction having a feed belt 9*a* for small objects 10*a* and a feed belt 9*b* for large objects 10*b*.

Furthermore, a construction is conceivable, as shown in FIG. 6, wherein a feed belt 9a for small objects 10a and a feed belt 9b for large objects 10b are provided rather than one feed belt 9, wherein the drive of the two conveyor belts and/or of coupling element 4 is controlled by control means (shown only in FIG. 2), in such a manner that the small objects 10b being supplied with one feed belt 9a, are delivered to receiving spaces 8 and the large objects 10a being supplied with the other feed belt 9b are delivered to receiving spaces 8'.

Possibly, more than two different dimensions for the receiving spaces may be used. Furthermore, it is possible to use feeding elements other than feed belts for placing the objects 10 into the receiving spaces 8 and/or 8'.

What is claimed is:

1. A conveyor comprising:

a frame;

a drivable endless conveying element movably supported on said frame, said conveying element moving on said frame in a direction of movement;

a plurality of carriers provided on and coupled to said conveying element, wherein each of said plurality of carriers extend transversely to said direction of movement of said conveying element during operation of said conveyor;

pusher elements supported on at least a few carriers of said plurality of carriers, wherein said pusher elements can be selectively moved in a longitudinal direction of an associated carrier of said plurality of carriers in at least one place during operation of said conveyor;

guide means connected to said pusher elements, wherein said guide means are capable of cooperation with guide rails supported by said frame in such a manner that a pusher element can be selectively moved in the longitudinal direction of the associated carrier in one or more places during operation;

upwardly extending wings provided on said plurality of carriers, wherein said wings are disposed one behind other in said direction of movement of said conveying element; and receiving spaces having different dimensions measured in said direction of movement of said conveying element, wherein said receiving spaces have open upper sides which are bound by said wings.

2. The conveyor according to claim 1, wherein said receiving spaces, of comparatively large dimensions measured in said direction of movement of said conveying element, are positioned between two groups of recesses of comparatively small dimensions measured in said direction of movement of said conveying element.

3. The conveyor according to claim 1 or 2, wherein said wings slope upwardly, to a rear of said direction of movement of said conveying element, and are attached to a rear edge of each of said plurality of carriers.

4. The conveyor according to claim 1, further comprising a feed element for supplying objects to be received in said receiving spaces and sensors, wherein said sensors sense dimensions of said objects to be received in said receiving spaces and which are being supplied by said feed elements and wherein said sensors also control a drive of any one of said feed element, said conveying element, and both said feed element and said conveying element in accordance with said dimensions of said objects, in such a manner that small objects of said objects are delivered to smaller receiving spaces of said receiving spaces and that large objects of said objects are delivered to larger receiving spaces of said receiving spaces.

5. The conveyor according to claim 1, further comprising at least one feed element for small objects of said objects and at least one feed element for large objects of said objects, and means for controlling a drive of any one of said feed element, said conveying element, and both said feed element and said conveying element, in such a manner that said small objects of said objects are delivered to small receiving spaces and that said large objects of said objects are delivered to large receiving spaces.

\* \* \* \* \*